US006589917B2

(12) United States Patent
Patel et al.

(10) Patent No.: US 6,589,917 B2
(45) Date of Patent: Jul. 8, 2003

(54) INVERT EMULSION DRILLING FLUIDS AND MUDS HAVING NEGATIVE ALKALINITY AND ELASTOMER COMPATIBILITY

(75) Inventors: Arvind D. Patel, Sugar Land, TX (US); Jim Friedheim, Spring, TX (US)

(73) Assignee: M-I LLC, Houston, TX (US)

(*) Notice: Subject to any disclaimer, the term of this patent is extended or adjusted under 35 U.S.C. 154(b) by 103 days.

(21) Appl. No.: 09/745,147

(22) Filed: Dec. 20, 2000

(65) Prior Publication Data

US 2001/0009890 A1 Jul. 26, 2001

Related U.S. Application Data

(63) Continuation-in-part of application No. 09/190,783, filed on Nov. 12, 1998, now abandoned, which is a continuation-in-part of application No. 09/130,914, filed on Aug. 7, 1998, now Pat. No. 5,977,031, which is a continuation-in-part of application No. 09/043,868, filed on Mar. 20, 1998, now Pat. No. 5,985,800, which is a continuation-in-part of application No. 08/862,198, filed on May 23, 1997, now Pat. No. 5,905,061.

(60) Provisional application No. 60/047,543, filed on May 23, 1997, and provisional application No. 60/023,043, filed on Aug. 2, 1996.

(51) Int. Cl.$^7$ .............................................. C09K 7/06
(52) U.S. Cl. ...................................... 507/138; 507/103
(58) Field of Search ................................. 507/103, 138

(56) References Cited

U.S. PATENT DOCUMENTS

| | | | | |
|---|---|---|---|---|
| 2,802,531 A | 8/1957 | Cardwell et al. | ............. | 166/42 |
| 2,900,336 A | 8/1959 | Brown et al. | ................. | 252/8.5 |
| 2,900,337 A | 8/1959 | Earley et al. | ................. | 252/8.5 |
| 3,804,760 A | 4/1974 | Darley | ....................... | 252/8.55 |
| 3,962,151 A | 6/1976 | Dekker et al. | ............. | 252/548 |
| 4,040,866 A | 8/1977 | Mondshine | .................. | 134/26 |
| 4,230,586 A | 10/1980 | Bretz et al. | ................... | 252/8.5 |
| 4,582,543 A | 4/1986 | Bretz | .......................... | 148/250 |
| 4,615,813 A | 10/1986 | Bretz | ....................... | 252/8.514 |
| 4,645,608 A | 2/1987 | Rayborn | .................... | 252/8.51 |
| 4,670,550 A | 6/1987 | Bleeker et al. | ............. | 536/114 |
| 4,735,731 A | 4/1988 | Rose et al. | ................. | 252/8.51 |
| 4,747,969 A | 5/1988 | Rupilius et al. | ............ | 260/415 |
| 4,830,765 A | 5/1989 | Perricone et al. | ........... | 252/8.51 |
| 4,941,981 A | 7/1990 | Perricone et al. | .......... | 252/8.51 |
| 4,963,273 A | 10/1990 | Perricone et al. | .......... | 252/8.51 |
| 4,964,615 A | 10/1990 | Mueller et al. | .......... | 252/8.551 |
| 5,057,234 A | 10/1991 | Bland et al. | ................ | 252/8.51 |
| 5,072,794 A | 12/1991 | Hale et al. | ..................... | 175/50 |
| 5,120,708 A | 6/1992 | Melear | ....................... | 507/126 |
| 5,156,686 A | 10/1992 | Van Slyke | .................... | 134/26 |
| 5,189,012 A | 2/1993 | Patel et al. | .................. | 507/103 |
| 5,254,531 A | 10/1993 | Mueller et al. | ............. | 507/131 |
| 5,403,820 A | 4/1995 | Walker | ....................... | 507/110 |
| 5,559,085 A * | 9/1996 | Duncan, Jr. | ................. | 507/103 |
| H1611 H | 11/1996 | Patel | ............................ | 507/103 |
| 5,634,984 A | 6/1997 | Van Slyke | .................. | 134/40 |
| 5,869,434 A * | 2/1999 | Mueller et al. | ............. | 507/138 |
| 5,905,061 A | 5/1999 | Patel | | |
| 5,977,031 A | 11/1999 | Patel | | |

FOREIGN PATENT DOCUMENTS

| | | | | |
|---|---|---|---|---|
| CA | 2068129 | 7/1992 | ............ | C09K/5/00 |
| DE | 2462436 A1 | 2/1977 | ............ | C10M/3/30 |
| DE | 3842703 A1 | 6/1990 | ............ | C09K/7/06 |
| DE | 3903784 A1 | 6/1990 | | |

(List continued on next page.)

OTHER PUBLICATIONS

Kirk–Othmer, "Encyclopedia of Chemical Technology", Third Edition, vol. 1, A to Alkanolamines, pp. 944–960, 1978.

Dickey, Parke A.; Petroleum Development Geology, pp. 57–83, 2nd Ed.; Penn Well Books before 1988.

"Fine and Functional Chemicals", Nitrogen Derivatives, AKZO General Catalog. Copyright 1990.

"Quaternary Ammonium Compounds", Fine and Functional Chemicals, AKZO Catalog. Copyright 1990.

The Dow Chemical Company; The Glycol Ethers Handbook, Oct. 1993.

Aldrich Katalog Handbuch Feinchemikalien, Aldrich GmbH & Co. KG, Steinheim, p. 557, DE 1994.

The Dow Chemical Company; Physical Properties of Dowanol Glycol Ethers and Acetates; table; Jun. 1995.

The Dow Chemical Company; Product Information—Dowanol DPNB, Apr. 1997.

The Dow Chemical Company; Product Information—Dowanol PNB, Apr. 1997.

The Dow Chemical Company; Material Safety Data Sheet, Oct. 20, 1997.

*Primary Examiner*—Philip Tucker
(74) *Attorney, Agent, or Firm*—Howrey Simon Arnold & White; Stephen H. Cagle; Carter J. White

(57) ABSTRACT

An invert emulsion suitable for drilling subterranean wells, in particular oil and gas wells is disclosed which has negative alkalinity and includes an oleaginous phase, and a non-oleaginous phase and an emulsifying agent which stabilizes the invert emulsion under conditions of negative alkalinity. The practice of the present invention permits the formulation of drilling fluids which are absent an alkaline reserve and are compatible with elastomers utilized in drilling equipment. Thus the invert emulsion fluids of the present invention are highly suitable for drilling oil and gas wells.

17 Claims, No Drawings

FOREIGN PATENT DOCUMENTS

| | | | |
|---|---|---|---|
| EP | 0137538 A2 | 4/1985 | ............ C90K/7/06 |
| EP | 0226250 A2 | 6/1987 | ............... C08J/3/08 |
| EP | 0271943 A2 | 6/1988 | ............ C09K/7/02 |
| EP | 0382070 A1 | 9/1989 | ............ C09K/7/06 |
| EP | 0386636 A1 | 3/1990 | |
| EP | 374671 A1 | 6/1990 | ............ C09K/7/06 |
| EP | 0382318 A1 | 8/1990 | ............ B01F/17/16 |
| EP | 449257 A2 | 10/1991 | ............ C09K/7/06 |
| EP | 495579 A3 | 7/1992 | ............ C09K/7/02 |
| EP | 0 652271 | 5/1995 | |
| EP | 730018 A1 | 9/1996 | ............ C09K/7/02 |
| GB | 2195685 A | 12/1988 | ............ C09K/7/06 |
| GB | 2223255 | 4/1990 | ............ C09K/7/06 |
| GB | 2251447 | 7/1992 | ............ C09K/7/06 |
| GB | 2252993 | 8/1992 | ............ C09K/07/06 |
| GB | 2283036 | 4/1995 | |
| WO | WO87/02692 | 5/1987 | ............ C09K/7/00 |
| WO | WO89/01491 | 2/1989 | ............ C07K/7/00 |
| WO | WO90/06890 | 6/1990 | |
| WO | WO90/06981 | 6/1990 | |
| WO | WO92/22622 | 12/1992 | ............ C09K/7/06 |
| WO | WO93/16145 | 8/1993 | ............ C09K/7/06 |
| WO | WO93/23491 | 11/1993 | ............ C09K/7/06 |
| WO | WO94/16030 | 7/1994 | ............ C09K/7/06 |
| WO | WO95/17244 | 6/1995 | ............ B01F/17/00 |
| WO | WO96/19545 | 6/1996 | ............ C09K/7/06 |
| WO | 0027945 | 5/2000 | ............ C09K/7/06 |

\* cited by examiner

INVERT EMULSION DRILLING FLUIDS AND MUDS HAVING NEGATIVE ALKALINITY AND ELASTOMER COMPATIBILITY

This is a continuation-in-part of U.S. patent application Ser. No. 09/190,783, filed Nov. 12, 1998 abandoned which is a continuation-in-part of U.S. patent application Ser. No. 09/130,914, filed Aug. 7, 1998, U.S. Pat. No. 5,977,031 which is a continuation-in-part of U.S. patent application Ser. No. 09/043,868 filed Mar. 20, 1998, U.S. Pat. No. 5,985,800 which claims priority of U.S. Provisional Patent Application No. 60/047,543 filed May 23, 1997 and which is a continuation-in-part of U.S. patent application Ser. No. 08/862,198 filed May 23, 1997, U.S. Pat. No. 5,905,061 which claims priority of U.S. Provisional Patent Application No. 60/023,043 filed on Aug. 2, 1996.

BACKGROUND OF THE INVENTION

For a number of years, oil based drilling fluids and invert emulsion muds have been utilized in the drilling of subterranean wells. These fluids typically are comprised of a hydrocarbon oil or mixtures of oils as the major component of the liquid phase to which various materials are added to impart the desired drilling fluid properties. These fluids are well adapted for use in underground formations containing water sensitive clays or shales which swell and disintegrate when contacted by water based drilling fluids. True oil-based fluids are substantially free of water, lose mostly oil as the filtrate and cause no swelling or disintegration of water sensitive clays and shales. Water-in-oil emulsions are also used as drilling fluids. These fluids contain oil as the continuous phase and water as the external or discontinuous phase. A water-in-oil emulsion is also known as an invert emulsion. The true oil-based and the invert emulsion muds generally contain one or more weighting agents, surfactants, viscosifiers, fluid loss control agents or bridging agents.

The primary benefits of selecting an oil based drilling fluid include: superior hole stability, especially in shale formations; formation of a thinner filter cake than the filter cake achieved with a water based mud; excellent lubrication of the drilling string and downhole tools; penetration of salt beds without sloughing or enlargement of the hole as well as other benefits that should be known to one of skill in the art.

An especially beneficial property of oil based drilling fluids are their excellent lubrication qualities. These lubrication properties permit the drilling of wells having a significant vertical deviation, as is typical of offshore or deep water drilling operations or when a horizontal well is desired. In such highly deviated holes, the torque and drag on the drill string are significant because the drill pipe lies against the low side of the hole. Under these conditions, the risk of pipe sticking is high when water based muds are used. In contrast oil based muds provide a thin, slick filter cake which helps to prevent pipe sticking. Thus the use of the oil based mud is preferred.

Invert emulsion fluids, i.e. emulsions in which the non-oleaginous fluid is the discontinuous phase and the oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the Article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein.

The components of the invert emulsion fluids include an oleaginous liquid such as hydrocarbon oil which serves as a continuous phase, a non-oleaginous liquid such as water or brine solution which serves as a discontinuous phase, and an emulsifying agent. As used herein, emulsifying agent and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in *Composition and Properties of Drilling and Completion Fluids,* 5th Edition, H. C. H. Darley, George R. Gray, Gulf Publishing Company, 1988, pp. 328–332, the contents of which are hereby incorporated by reference.

Lime or other alkaline materials are typically added to conventional invert emulsion drilling fluids and muds to maintain a reserve alkalinity. See, for example, API Bulletin RP 13B-2, 1990, p. 22 which describes a standard test for determining excess lime in drilling mud. See also, for example, U.S. Pat. No. 5,254,531 which employs lime along with an ester oil, a fatty acid, and an amine and EP 271943 which employs lime along with oil, water, and an ethoxylated amine. The generally accepted role of the reserve alkalinity is to help maintain the viscosity and stability of the invert emulsion. This is especially important in areas in which acidic gases such as $CO_2$ or $H_2S$ are encountered during drilling. Absent an alkaline reserve, acidic gases will weaken stability and viscosity of conventional invert emulsion fluids to the point of failure. That is to say the invert emulsion becomes so unstable that the oil wet solids become water wet and the phases of the invert emulsion "flip" thus rendering the invert emulsion fluid not suitable for use as a drilling fluid. One of skill in the art should understand that due to the high cost of removing and disposing of the flipped mud from a borehole, the formation of flip mud is very undesirable. Further because the beneficial properties of the drilling fluid have been lost, (i.e. viscosity, pumpability and the ability to suspend particles) the likelihood of a blowout is greatly increased. Thus, one of ordinary skill in the art should understand that the maintenance of an alkalinity reserve is critical to the use of conventional invert emulsion drilling fluids and muds.

Environmental regulations have also severely limited the use of oil based and invert emulsion oil muds as drilling fluids. Of particular concern is the disposal of oil coated drilling cuttings especially in offshore or deep water drilling operations. Environmentally sound disposal of oil-coated cuttings is required which in these latter cases, the cuttings must be either processed onboard the drilling rig, or the cuttings must be shipped back to shore for disposal in an environmentally safe manner. In order to address these environmental issues, synthetic based drilling fluids and muds were developed. The oleaginous component of the synthetic based drilling fluid may typically be selected from esters, ethers, internal olefins, polyalpha olefins and other environmentally compatible fluids. However, the formulation and selection of the based fluid had to take into account the compatibility of other components in the drilling fluid.

While synthetic based drilling fluids successfully solve environmental concerns, these fluids often introduce new concerns downhole because the components of the fluid alter the structural compositions and mechanical properties of the elastomers used in oil field equipment. It has been reported in the literature that synthetic fluids, especially those containing esters and ethers exhibit compatibility problems with the elastomers used in a variety of oil field equipment, including blowout preventors, pulsation dampener bladders, drill motors, o-rings, boots and packers. For example see "Drilling Fluid Type Affects Elastomer Selection" by Venu Bodepudi, J. Michael Wilson and Arvind Patel, Oil & Gas Journal, Oct. 26, 1998, pages 75–79. As discussed in this article, the synthetic based drilling fluids can induce hysteresis, swelling, shrinkage, pre-mature degradation, embrittlement, and break-up of the elastomer. Synthetic based drilling fluids may also destroy the bond between the elastomer and the metal portions of the tool. Low molecular weight esters and ethers were found to be particularly problematic. In order to overcome this problem, some researchers have focused on the development of newer and better elastomers by adjusting polymer blends.

SUMMARY OF THE INVENTION

The present invention is generally directed to an invert emulsion drilling fluid or mud suitable for drilling subterranean wells. The fluids of the present invention include a mixture of an ester based synthetic drilling fluid and a hydrocarbon under conditions of negative alkalinity such that there is elastomer compatibility. The invert emulsion drilling fluids of the present invention are formulated so as to have a negative alkalinity as is defined herein. Such an illustrative fluid should generally include: an oleaginous phase; a non-oleaginous phase and an emulsifying agent capable of stabilizing the invert emulsion under conditions of negative alkalinity. The oleaginous phase may be hydrocarbons such as diesel oil, mineral oil, synthetic oils, polyalpha olefins, combined with esters of $C_1$ to $C_{12}$ alcohols and a $C_8$ to $C_{24}$ monocarboxylic acid. Preferably the ester is selected from $C_1$ to $C_{12}$ alkyl alcohol esters of oleic acid, $C_1$ to $C_{12}$ alkyl alcohol esters of myristic acid, $C_1$ to $C_{12}$ alkyl alcohol ester of coco fatty acid, and mixtures thereof. The emulsifying agent should be capable of stabilizing the invert emulsion in the absence of an alkali reserve. That is to say the addition of an aqueous acidic solution to the invert emulsion should not cause the invert emulsion to break. The non-oleaginous phase should preferably have a hydroxide ion concentration of less than $1\times10^{-8}$ moles per liter. Optionally the illustrative drilling fluid may include a weighting agent selected from barite, calcite, mullite, gallena, manganese oxides, iron oxides, or combinations thereof. The non-oleaginous phase of the drilling fluid is preferably selected from aqueous solutions including fresh water, sea water, brine, aqueous solutions containing water soluble organic salts, water soluble alcohols or water soluble glycols or combinations thereof.

Another encompassed embodiment of the present invention is an alkali reserve free invert emulsion drilling fluid that is formulated so that the drilling fluid includes: an oleaginous phase which may be substantially composed of a mixture of hydrocarbons and esters of $C_1$ to $C_{12}$ alcohols and a $C_8$ to $C_{24}$ monocarboxylic acid; a non-oleaginous phase and a emulsifying agent capable of stabilizing the invert emulsion absent an alkali reserve. The illustrative drilling fluid should be formulated to form an invert emulsion drilling fluid that is compatible with elastomeric materials.

Further encompassed by the present invention is an invert emulsion drilling fluid of the present invention the formulation includes: an oleaginous phase comprising substantially of hydrocarbon fluids and partially of esters of $C_1$ to $C_{12}$ alcohols and a $C_8$ to $C_{24}$ monocarboxylic acid; a non-oleaginous phase; and an emulsifying agent capable of stabilizing the invert emulsion in the absence of an alkali reserve and wherein said fluid is absent an alkaline reserve. The illustrative drilling fluid should be formulated to form an invert emulsion drilling fluid that is compatible with elastomeric materials.

Also encompassed within the scope of the present invention are the methods of making and using the invert emulsion drilling fluids disclosed herein. Thus one illustrative method embodiment of the present invention includes a method of drilling a subterranean well with an invert emulsion drilling fluid including: formulating a negative alkalinity invert emulsion drilling fluid such that the drilling fluid includes, an oleaginous phase, preferably comprising substantially of a hydrocarbon and esters of $C_1$ to $C_{12}$ alcohols and a $C_8$ to $C_{24}$ monocarboxylic acid; a non-oleaginous phase; and an emulsifying agent which is capable of stabilizing the invert emulsion in the absence of an alkali reserve; and drilling said well with said invert emulsion drilling fluid.

DESCRIPTION OF ILLUSTRATIVE EMBODIMENTS

As used herein, the term "invert emulsion" is an emulsion in which a non-oleaginous fluid is the discontinuous phase and an oleaginous fluid is the continuous phase. The novel invert emulsion fluids of the present invention are useful in a similar manner as conventional invert emulsion fluids which includes utility in preparation for drilling, actually drilling, completing and working over subterranean wells such as oil and gas wells. Such methods of use of conventional inverse emulsion fluids are described in, for example, *Composition and Properties of Drilling and Completion Fluids*, 5th Edition, H. C. H. Darley, George R. Gray, Gulf Publishing Company, 1988, the contents which are incorporated by reference, as well as, U.S. Pat. No. 5,254,531 and EP 271943 which are incorporated by reference. One of skill in the art should know and understand the standard methods of determining if an invert emulsion has been formed. Examples of two such tests for the formation of an invert emulsion include the Invert Emulsion Test as disclosed herein and the measurement of the electrical stability of the invert emulsion.

As used herein the term "alkalinity" means a presence of an alkaline reserve as is measured using the methods setforth in API Bulletin RP 13B-2, 1990, which describes a standard test for determining excess lime in drilling mud, the contents of which are hereby incorporated by reference.

As used herein the terms "negative alkalinity" or "negative alkaline reserve" mean an the absence of an alkaline reserve or that condition of the invert emulsion which would require the addition of alkaline reserve material so as to establish a measurable value of alkalinity. That is to say one of skill in the art would consider the invert emulsion to be acidic in nature and thus require the addition of sufficient alkaline reserve material to neutralize any acidic components present as well to establish the desired alkaline reserve. Alternatively negative alkalinity or negative alkaline reserve may be considered as being that state of an invert emulsion drilling fluid in which the non-oleaginous phase has a hydroxide ion (OH⁻) concentration of less than $1 \times 10^{-7}$ moles per liter and more preferably a hydroxide ion concentration of less than $1 \times 10^{-8}$ moles per liter. One of ordinary skill in the art should understand that a hydroxide ion concentration of $1 \times 10^{-8}$ may be expressed as a pOH value of 8 which in aqueous solution corresponds to a pH of 5. The hydroxide ion concentration may be tested by separating the two phases, for example by allowing the emulsion to separate over the course of several days to weeks, and then carefully measuring the hydroxide ion concentration of the non-oleaginous phase by conventional means which should be known to one of skill in the art.

As used herein the term "oleaginous liquid" means an oil which is a liquid at 25° C. and immiscible with water. Oleaginous liquids typically include substances such as hydrocarbons used in the formulation of drilling fluids such as diesel oil, mineral oil, synthetic oil (including linear alpha olefins and internal olefins), ester oils, glycerides of fatty acids, aliphatic esters, aliphatic ethers, aliphatic acetals, or other such hydrocarbons and combinations of these fluids. In one illustrative embodiment of this invention the oleaginous liquid includes a mixture of hydrocarbon oil and an ester material which provides compatibility with the elastomeric materials used. Such esters are described in greater detail hereafter.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25° C. and which is not an oleaginous liquid as defined above. Non-oleaginous liquids are immiscible with oleaginous liquids but capable of forming emulsions therewith. Typical non-oleaginous liquids include aqueous substances such as fresh water, sea water, brine containing inorganic or organic dissolved salts, aqueous solutions containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

As the term is used herein, the term "surfactant" and "emulsifier" or "emulsifying agent" are used interchangeably to indicate that component of the invert emulsion drilling fluid that stabilizes the invert emulsion. One of ordinary skill in the art should appreciate that such a compound acts at the interface of the oleaginous and the non-oleaginous fluids and lowers the differences in surface tension between the two layers. In the present invention it is important that the emulsifying agent is not adversely affected by the presence of acid in the non-oleaginous component of the invert emulsion. The ability of any particular emulsifying agent to stabilize the invert emulsion can be tested by using the invert emulsion test disclosed below. In addition if the emulsifying agent is to be useful in the formulation of a drilling fluid, the emulsifier should be thermally stable. That is to say, the emulsifier must not break down or chemically degrade upon heating to temperatures typically found in a downhole environment. This may be tested by heat aging the emulsifier as is done in the Examples. A suitable emulsifier within the scope of the present invention should be capable of stabilizing the invert emulsion under conditions of negative alkalinity and heat aging.

In one preferred embodiment of the present invention, the emulsifying agent is a combination of an amidoamine primary emulsifier, such as a diethylene triamine fatty acid, commercially available as Ecogreen-P from M-I L.L.C., a fatty acid based secondary emulsifier, such as a tall oil fatty acid, commercially available as Ecogreen-S from M-I L.L.C. and a polymeric fluid loss control agent, such as a oil dispersible polystyrene butdiene copolymer, commercially available as Ecogreen-F from M-I L.L.C. One of skill in the art should understand that the selection of this combination of specific emulsifiers is but one of many possible combinations of emulsifiers having similar properties and characteristics. The process of testing any particular selection of a suitable emulsifier or emulsifier package may depend upon the conditions and components of the drilling fluids and thus the use of the Invert Emulsion test disclosed herein should be utilized.

In another embodiment of the present invention the emulsifying agent is a protonated amine. As used herein, the term "amine" refers to compounds having the structure $R-NH_2$ wherein R represents a $C_{12}-C_{22}$ alkyl group, a $C_{12}-C_{22}$ alkenyl group, a $C_3-C_8$ cycloalkyl group substituted with a $C_9-C_{14}$ alkyl or alkenyl group, or a $C_9-C_{14}$ alkyl or alkenyl group substituted with a $C_3-C_8$ cycloalkyl group. Preferable R groups include straight or branched dodecyl, tridecyl, tetradecyl, pentadecyl, hexadecyl, heptadecyl, octadecyl, nodecyl, eicosyl, heneicosyl, docosyl, as well as, mixtures and unsaturated derivatives thereof. Preferable unsaturated derivatives include soyaalkylamine (Armeen S™ available from Akzo Chemicals Inc.) and tallowalkylamine (Armeen T™ available from Akzo Chemicals Inc.). Many of the other above amines are also commercially available from Akzo Chemicals Inc. under the tradename Armeen™. Other oleophillic amines may be used in the practice of the present invention so long as their protonated salt stabilizes the invert emulsion. Such amines can be determined by one of ordinary skill in the art by trial and error testing of the protonated amine and its ability to form a stable invert emulsion under conditions of negative alkalinity.

The aforementioned amines of the formula $R-NH_2$ are protonated for use in the present invention. The term "protonated" means that the amine is converted to the structure $R-N^+-H_3$ $B^-$. Typically, such protonation occurs due to reaction of the amine with a water-soluble acid as discussed below. Generally, the type of counter-ion, $B^-$, is not particularly critical so long as it does not adversely affect the performance and characteristics of the resulting emulsion as is disclosed herein. Examples of the counter-ion include the conjugate bases of the acids described below.

The protonated amine functions in the instant invention as a surfactant to lower the interfacial tension of the liquids so that the non-oleaginous liquid may form a stable dispersion of fine droplets in the oleaginous liquid (i.e. form an invert emulsion). Therefore, the amount of protonated amine should be sufficient to enable the formation of an invert emulsion. While this amount may vary depending upon the nature and amount of the oleaginous liquid and non-oleaginous liquid, typically the amount of protonated amine is at least about 0.1, preferably at least about 5, more preferably at least about 10 percent by weight to volume of the total fluid. Correspondingly, the amount should not be so great that the protonated amine interferes with the stability of the invert emulsion fluid or the performance of the invert emulsion as a drilling fluid.

As used above, the term "acid" refers to water-soluble, i.e. at least 10 percent by volume of the acid dissolves in water, compounds which form "acidic solutions". A solution is considered to be an "acidic solution" if it is capable of protonating the amine and render a stable non-oleaginous fluid in oleaginous fluid emulsion. The term acid refers to both inorganic acids such as sulfuric, nitric, hydrofluoric, hydrochloric and phosphoric acid and organic acids such as citric, acetic, formic, benzoic, salicyclic, oxalic, glycolic, lactic, glutaric acid, halogenated acetic acids, boric acid, organosulfonic acids, organophosphoric acids and the like. Fatty acids such as oleic, palmitic, and stearic acid are less desirable as acids because such acids are not water-soluble. Compounds that generate acidic solutions upon dissolution in water are also considered "acids" as the term is used herein. For example such acids may include, acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and similar such compounds. Thus in one embodiment, the acidic solution is formed by the dissolution of an acidic metal salt in water. That is to say the upon dissolution of the metal salt, a sufficient concentration of protons are produced the resulting solution is capable of protonating the amine and render a stable non-oleaginous fluid in oleaginous fluid emulsion. In another embodiment the acidic solution is a brine formed by the dissolution of a neutral metal salt and an acidic metal salt in water. In yet another embodiment, an acidic solution may be formed by the dissolution of a acid compound and a neutral salt.

When an amine surfactant is present, the amount of acid must be sufficient to protonate a majority of the amine thus making it capable of stabilizing the invert emulsions under conditions of negative alkalinity. As one skilled in the art should appreciate, the amount of acid will necessarily vary with the strength of the acid and the particular amine to be protonated. Nevertheless, one skilled in the art having the benefit of this specification may readily determine the necessary amount of acid via routine experimentation by systematically adjusting the amount and type of acid to be used with any particular amine and then testing to see if the resulting protonated amine is capable of forming and stabilizing an invert emulsion.

As used herein the term "ester" has been used in relation to the oleaginous fluid component of the invert emulsions of the present invention. Such use of the term "ester" should be broadly construed to include all esters that are suitable for use in drilling fluids. In one preferred embodiment, the term "ester" generally includes esters formed in the esterification reaction of a $C_1$ to $C_{12}$ alcohol and a $C_8$ to $C_{24}$ monocarboxylic acid. Optionally the ester may be the product of the esterification reaction between a $C_1$ to $C_{12}$ alcohol and a $C_4$ to $C_{12}$ polycarboxylic acid. An illustrative example of a poly-functional carboxylic acid may be succinic acid which would form a di-ester in the esterification reaction with a $C_1$ to $C_{12}$ alcohol.

The esters suitable for use in the present invention should be oleaginous and capable of forming invert emulsion with water or other aqueous based fluids. In addition the esters which may be utilized in the present invention may be broadly selected from esters formed from $C_1$–$C_{12}$ alcohols and mono-functional or poly-functional carboxylic acids, so long as the esters flow and can be pumped at temperatures in the range from about 0° to about 25° C. Such esters should also be selected so that the flash point of the ester does not create a combustion hazard on the drilling rig. Therefore the esters of the present invention should be selected so as to have a flash point greater than about 100° F. and preferably a flash point greater than about 130° F. In one preferred embodiment the flash point of the ester is in the range from about 125° F. to about 150° F. Another property of the esters of the present invention is that of viscosity. The ester should be selected so that it has a viscosity that is suitable for use in a drilling fluid. Preferably the viscosity should be less than about 15 centistokes at about 100° C. and more preferably less than about 10 centistokes at about 100° C.

Esters that may be utilized in the practice of the present invention do not show the same in-use behavior as the ester based drilling fluids reported prior to the present invention. In practical application, the esters of $C_1$ to $C_{12}$ alcohol and $C_8$ to $C_{24}$ monocarboxylic acid undergo hydrolysis in the presence of hydroxide ion ($OH^-$), resulting in the formation of the corresponding alcohol and carboxylic acid. The formation of acid in conventional ester based drilling fluid is of great concern because such fluids have an alkaline reserve which is chemically neutralized by the acids thus destabilizing the invert emulsion drilling fluid. Further the acid in the presence of lime may form a calcium soap which further promotes the adverse effect on rheology of the invert emulsion. The hydrolysis reaction is reported to be the primary reason for the careful selection of esters that are either thermodynamically or kinetically stable with regard to the hydrolysis reaction. Another reported approach has been the addition of amine compounds in combination with a mild alkaline reserve. The role of the amine compound is to preferentially react with the acids generated by the hydrolysis reaction. Thus, the amine compound serves as a "buffer" for the alkaline reserve and prevents its consumption by the fatty acids generated by the hydrolysis reaction.

The above is in contrast with the teachings of the present invention in which an invert emulsion drilling fluid may be based on ester oils despite the difficulties of hydrolysis inherent in the use of ester based materials in a conventional ester based invert emulsion drilling fluid. In particular it is believed that the negative alkalinity of the invert emulsion drilling fluids of the present invention greatly reduces the hydrolysis reaction. Further the presence of carboxylic acid has no deleterious effect on the protonated amine surfactant which stabilizes the invert emulsion. Thus rather than reducing the rate of hydrolysis by the careful selection of the ester or providing an alkaline reserve "buffer", the present invention greatly reduces the hydrolysis of the ester by substantially eliminating the source of hydroxide ion, i.e. the alkaline reserve.

As already stated, the choice of esters which may be utilized in the invention disclosed herein may be selected from the general class of reaction products of monofunctional carboxylic acids with monofunctional alcohols. In addition, however, it is intended in accordance with the invention to at least predominantly use $C_8$–$C_{24}$ carboxylic acids. The carboxylic acids may be derived from unbranched or branched hydrocarbon chains, preferably linear chains and may be saturated, monounsaturated or polyunsatutrated. Selected individual esters formed from an alkyl monocarboxylic acid and a monoalcohol can be used as the ester oil in accordance with the invention. So far as the rheology of the system is concerned and/or for reasons of availability, it is frequently desirable to use esters from acid mixtures. This is of importance so far as meeting the above-stated specifications of the two-classes for preferred ester oils is concerned.

Economically the selection of the ester utilized in the present invention becomes very important because the present invention allows the use of primary alcohol esters and secondary alcohol esters that previously had a limited application due to their rapid rate of hydrolysis in the presence of hydroxide ion. Thus the selection of the alcohol portion of the esters utilized in the present invention may be based on economic considerations of cost and availability and not necessarily on the rate of hydrolysis of the ester. In view of the teaching of the present disclosure, one of skill in the art should understand that the broad group of $C_1$–$C_{12}$ alcohols includes alcohols selected from: primary alkyl alcohols such as for example, methanol, ethanol, n-propanol, n-butanol, n-pentanol, and the like, branched primary alcohols such as 2-methylpropan-1-ol. 2,2-dimethylpropan-1-ol, 2,2-dimethylbutan-1-ol, 3,3-dimethyl butan-1-ol and the like; secondary alkyl alcohols and tertiary alkyl alcohols as well as unsaturated alcohols which previously have not be used due to the problems with hydrolysis due to the presence of an alkaline reserve.

Upon review of the present disclosure, one of skill in the art should appreciate that esters of the present invention may be preferably selected from: $C_1$ to $C_{12}$ alkyl alcohol esters of oleic acid, $C_1$ to $C_{12}$ alkyl alcohol esters of myristic acid, $C_1$ to $C_{12}$ alkyl alcohol ester of coco fatty acid, combinations and mixtures thereof. More preferably, esters which afford especially high economic cost savings and thus are more preferred include: oleate methyl ester, isopropyl meristate ester, methyl ester of coco fatty acid. However the selection of any particular ester, as previously noted may depend upon availability and economic considerations such as cost.

Various supplemental surfactants and wetting agents conventionally used in invert emulsion fluids may optionally be incorporated in the fluids of this invention. Such surfactants are, for example, fatty acids, soaps of fatty acids, amido amines, polyamides, polyamines, oleate esters, imidazoline derivatives, oxidized crude tall oil, organic phosphate esters, alkyl aromatic sulfates and sulfonates, as well as, mixtures of the above. Generally, such surfactants are employed in an amount which does not interfere with the fluids of this invention being used as drilling fluids.

Viscosifying agents, for example, organophillic clays, may optionally be employed in the invert drilling fluid compositions of the present invention. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight to volume of the total fluid. VG-69™ and VG-PLUS™ are organoclay materials and Versa HRP™ is a polyamide resin material manufactured and distributed by M-I L.L.C. which are suitable viscosifying agents.

The invert emulsion drilling fluids of this invention may optionally contain a weight material. The quantity and nature of the weight material depends upon the desired density and viscosity of the final composition. The preferred weight materials include, but are not limited to, barite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon.

Fluid loss control agents such as modified lignite, polymers, oxidized asphalt and gilsonite may also be added to the invert drilling fluids of this invention. Usually such fluid loss control agents are employed in an amount which is at least about 0.1, preferably at least about 1, more preferably at least about 5 percent by weight to volume of the total fluid.

The method of preparing the drilling fluids of the present invention is not particularly critical so long as an invert emulsion is formed under conditions of negative alkalinity and the resulting fluid is compatible with the elastomeric materials used in drilling equipment. Generally, the components may be mixed together in any order under agitation condition. When an amine surfactant is used, it is important that the amine surfactant be protonated for the formation of invert emulsion with the oleaginous and non-oleaginous fluids. A representative method of preparing said invert emulsion fluids comprises mixing an appropriate quantity of oleaginous fluid and an appropriate quantity of surfactant together with continuous, mild agitation. A non-oleaginous fluid is then added while mixing until an invert emulsion is formed. If weight material, such as those described below, are to be added, then the weight material is typically added after the invert emulsion fluid is formed.

One skilled in the art may readily identify whether the appropriate ingredients and amounts have been used to form an invert emulsion by using the following test:

INVERT EMULSION TEST: A small portion of the emulsion is placed in a beaker which contains an oleaginous fluid. If the emulsion is an invert emulsion, the small portion of the emulsion will disperse in the oleaginous fluid. Visual inspection will determine if it has so dispersed.

Alternatively, the electrical stability of the invert emulsion may be tested using a typical emulsion stability tester. Generally the voltage applied across two electrodes is increased until the emulsion breaks and a surge of current flows between the two electrodes. The voltage required to break the emulsion is a common measure of the stability of such an emulsion. Other tests are described on page 166 of the book, *Composition and Properties of Drilling and Completion Fluids*, 5th Edition, H. C. H. Darley and George Gray, Gulf Publishing Company, 1988, the contents of which are hereby incorporated by reference.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

The following examples are submitted for the purpose of illustrating the performance characteristics of the drilling fluid compositions of this invention. These tests were conducted substantially in accordance with the procedures in API Bulletin RP 13B-2, 1990 which is incorporated herein by reference. The following abbreviations may be used in describing the results of experimentation:

"E.S." is electrical stability of the emulsion as measured by the test described in *Composition and Properties of Drilling and Completion Fluids,* 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotropic properties of a drilling fluid, measured in pounds per 100 square feet (lb/100 ft$^2$).

"API F.L." is the term used for API filtrate loss in milliliters (ml).

"HTHP" is the term used for high temperature high pressure fluid loss at 200° F., measured in milliliters (ml) according to API bulletin RP 13 B-2, 1990.

As used in the formulation of the drilling fluids illustrated in the following example the following component names are intended to mean the following:

IO C$_{16-18}$ it is AMODRIL product that is an isomerized olefin having a range of carbon chain length between 16 and 18 carbons.

Finagreen BDMF® is fatty acid ester distributed by FINA chemicals.

Ecogreen-P® is a primary surfactant package distributed by M-I L.L.C.

Ecogreen-S® is a secondary surfactant package distributed by M-I L.L.C.

Ecogreen-F® is a polymeric fluid loss control agent distributed by M-I L.L.C.

isopropyl meristate ester is fatty acid ester obtained from R I T A chemicals.

CoCo fatty acid methyl ester is obtained from FINA Chemicals.

Oleate methyl ester was obtained from FINA Chemicals.

VERSALIG is fluid loss control agent distributed by M-I L.L.C.

NOVATHIN is surfactant distributed by M-I L.L.C.

EMI-545 is a protonated amine acetate surfactant of the present invention which is distributed by M-I L.L.C.

NOVAWET is surfactant distributed by M-I

All values associated with the formulations described below are grams unless otherwise specified.

EXAMPLE 1

In the following example, various synthetic fluids were tested for their effect on the properties of elastomers. The fluids selected and tested were chosen to illustrate the effects of chemical composition, structure, molecular weight and functionality of the drilling fluid types commonly used in drilling operations. General mud formulations and a list of fluids tested are given in Tables 1 and 2.

TABLE 1

| Material | Weight (g) |
|---|---|
| base oil | 148 |
| lime | 4 |
| organophilic clay | 4 |
| emulsifier | 8 |
| wetting agent | 4 |
| 20% CaCl$_2$ brine | 106 |
| barite | 247 |

The following abbreviations are used for the following base fluids.

TABLE 2

| Base Fluid | Abbreviations |
|---|---|
| diesel #2 | DO |
| low toxicity mineral oil | LTMO |
| isomerized alpha olefin | IO |
| C$_{14}$ alcohol | Alc. |
| methyl ester of coco fatty acid | MeCo |
| octyl fish oil fatty acid ester | OFA |
| dialkyl acetal | Acetal |
| diundecyl maleate | DUMA |
| dialkyl carbonate | DC |
| silicon fluid | SF |
| propylene glycol n-butyl ether | PNB |
| dipropylene glycol n-butyl ether | DPNB |
| tripropylene glycol n-butyl ether | TPNB |
| polypropylene glycol n-butyl ether | PPNB |

Commonly used elastomers were also used in these tests. The detailed chemical compositions of each elastomer is complex and proprietary to the manufacturers. In general each elastomer used may be classified according to its chemical type and specific use. A list and generic description of the elastomer used in this experiment is given in Table 3.

TABLE 3

| Elastomer Material | |
|---|---|
| Peroxide cured BUNA Nitrile Hardness 90 | BUNA "O" ring |
| Nitrile - Cameron | M1-4, M152, M159, M136 |
| Nitrile/Carbonxylated Polymer | XNBR-Poly 10 |
| Nitrile/Hydrogenated Nitrile | XNBR-HNBR 20 |
| Nitrile/Hydrogenated Nitrile | XNBR-HNBR 40 |
| Nitriles | EDL-21, EDL-38 |
| Carboxylated Nitrile | CSCN-1A |

The physical testing of the elastomers were selected to measure the performance required by oilfield applications. The following four tests were used:

1) Tensile strength—This test involves the measurement of stress-strain under tension. This test is widely used to determine the effects of liquid immersing on aging. Dumbbells carved from flat sheets of the test materials were used. Tensile stress is calculated as the ratio of observed force to the cross-sectional area of the un-stretched sample.

2) Hardness—hardness is defined as the resistance to indentation under conditions that do not puncture the test material. A spring loaded pocket durometer was used for measurement of the hardness of the samples.

3) Length and volume measurements—The measurement of the length and volume change of the test sample was made after immersion of the elastomer in the test fluids. The swelling volume was calculated on the basis of uniform percent swelling in all directions.

4) Weight Change—The measurement of the percent weight change of the test sample was made after immersion in the test fluids for a specified time period and temperature.

The compatibility tests of the elastomers with the fluids were conducted in a stainless steel aging cell with 350 ml of test fluid. The elastomer samples were immersed in the fluid. The aging cell was sealed and heat aged at constant temperature under static conditions at the specified time and temperatures. The test temperatures ranges from ambient to 300F and the time ranged from initial to 168 hours.

Representative data from the above testing is presented in the following tables.

TABLE 4

Percent Change in Properties after Heat Aging in Drilling Fluid for 72 hours at 300° F.

| Elastomer | Volume (% change) | Hardness (% change) | Density (% change) | Tensile Strength (% change) |
|---|---|---|---|---|
| DO Drilling Fluid | | | | |
| EDL-21 | 8 | −22 | −2 | −16 |
| EDL-38 | 12 | −18 | −4 | −4 |
| CSCN-1A | 11 | −18 | −3 | −37 |
| IO Drilling Fluid with Amine Surfactant | | | | |
| EDL-21 | 0 | 2 | −1 | −11 |
| EDL-38 | 1 | 0 | −1 | −4 |
| CSCN-1A | 1 | −2 | −2 | −16 |
| IO Drilling Fluid with Amido-amine Surfactant | | | | |
| EDL-21 | −4 | 6 | 0 | −10 |
| EDL-38 | −4 | 12 | 0 | 2 |
| CSCN-1A | −3 | 10 | 1 | −10 |
| OFA Drilling Fluid | | | | |
| EDL-21 | 10 | −22 | −5 | −18 |
| EDL-38 | 10 | −15 | −5 | −11 |
| CSCN-1A | 8 | −23 | −4 | −33 |
| LTMO Drilling Fluid | | | | |
| EDL-21 | 1 | 3 | −9 | −15 |
| EDL-38 | 3 | 2 | −2 | −17 |
| CSCN-TA | −3 | 2 | −2 | −15 |
| DPNB Drilling Fluid | | | | |
| EDL-21 | 55 | −54 | −10 | −62 |
| EDL-38 | 59 | −55 | −9 | −47 |
| CSCN-TA | 82 | −65 | −12 | −85 |

TABLE 5

Change in Properties after Heat Aging in Drilling Fluid for 72 hours at 300° F.

| | | | Properties | | |
|---|---|---|---|---|---|
| Fluid Tested | Elastomer Tested | Volume (%) | Hardness Final/Initial | Tensile Final/Initial | Elongation Final/Initial |
| IO $C_{16}$-$C_{18}$ | MI-36 | 9 | 75/80 | 1683/3060 | 112/342 |
| Methyl Ester | MI-36 | 25 | 60/80 | 2390/3060 | 217/342 |
| IO $C_{16}$-$C_{18}$ | MI-59 | 11 | 77/83 | 702/2776 | 26/352 |
| Methyl Ester | MI-59 | 22.3 | 62/83 | 2162/2776 | 224/352 |

EXAMPLE 2

In the following example, blends of IO-$C_{16-18}$ mixed with the methyl ester of either rapeseed or sunflower seed oils were formulated and tested for the effect on the properties of elastomers. The compatibility tests of the elastomers with the fluids were conducted in a stainless steel aging cell with 350 ml of test fluid. The elastomer samples were immersed in the fluid. The aging cell was sealed and heat aged at constant temperature under static conditions at the specified time and temperature.

Representative data from the above testing is presented in the following table.

TABLE 6

Percent Change in Properties after Heat Aging in Drilling Fluid for 72 hours at 250° F.

| Elastomer | Weight (% change) | Hardness (% change) | Thickness (% change) |
|---|---|---|---|
| IO-$C_{16-18}$ +Rapeseed 50/50 vol % | | | |
| HN89 | −5.4 | 5 | 2.8 |
| RM100 | 5.6 | −18 | 3.8 |
| IO-$C_{16-18}$ Rapeseed 75/25 vol % | | | |
| HN89 | −6 | 4 | 2.3 |
| RM100 | 1.3 | −11 | 2.2 |
| IO-$C_{16-18}$ + Sunflower 50/50 vol % | | | |
| HN891 | −5.7 | 1 | 2.6 |
| RM100 | 6.0 | −21 | 3.2 |
| IO-$C_{16-18}$ + Sunflower 75/25 vol % | | | |
| HN89 | −5.9 | 1 | 3.6 |
| RM100 | 1.7 | −15 | 2.6 |

For HN89, the IO—$C_{16-18}$ causes most of the change in properties. The methyl ester of rapeseed and the methyl ester of sunflower oils appear to temper the effect of the IO—$C_{16-18}$ upon the elastomer properties. For RM100, there appears to be a much smaller weight gain in the 75/25 solutions than in the 50/50 solutions. One of skill in the art should appreciate that this indicates that the methyl ester of rapeseed oil and the methyl ester of sunflower oil are having an effect on the elastomer properties. With the thickness change, the reduction in the methyl ester component from the 50/50 solution to the 75/25 solution appears to reduce the thickness gain. One of skill in the art should also appreciate that the methyl ester of rapeseed and the methyl ester of sunflower oils are having an effect on the elastomer properties. The same is true for the hardness results where the 50/50 solution appears to have a greater damaging effect on the elastomer properties.

In view of the above, one of ordinary skill in the art should appreciate that the fluids of the present invention possess the properties desired in a drilling fluid and that the continuous phase of such fluids has an enhanced compatibility with elastomers utilized in oil well drilling equipment.

EXAMPLE 3

A blend IO—$C_{16-18}$ mixed with the methyl ester of either rape seed or sunflower seed oils were formulated into muds, the first having negative alkalinty and the second with two pounds per barrel (ppb) of lime. The fluids were prepared to have a mud weight 13.0 ppg, S/W (continuous phase to water) ratio 80/20, in combination with VG-PLUS, Ecogreen P, S, F, and using a 25% calcium chloride brine as the non-oleaginous phase.

The mud was mixed on a Hamilton beach mixer then sheared on a Silverson mixer to 135° F. prior to determining the properties. Properties were checked before and after hot rotating for 16 hours at 250° F. The rheological properties with Fan 35A model, were checked at 40° F. and 150° F. Formulations and properties for those fluids tested are given in the following Tables.

TABLE 7

|  | Negative Alkalinity | | With Lime | |
|---|---|---|---|---|
| Fluid Formulation | 1 | 2 | 3 | 4 |
| Blended 50/50 $IO_{16-18}$/Methyl Ester Rapeseed Oil, bbl | 0.62 | — | 0.63 | — |
| Blended 50/50 $IO_{16-18}$/Methyl Ester Sun flower Oil, bbl | — | 0.62 | — | 0.63 |
| VG-PLUS, ppb | 2 | 2 | 2 | 2 |
| Lime, ppb |  |  | 2 | 2 |
| Ecogreen P, ppb | 4 | 4 | 6 | 6 |
| Ecogreen 5, ppb | 2 | 2 | 2 | 2 |
| EMI-526, ppb | 2 | 2 | 2 | 2 |
| Aramac HT, ppb | 4 | 4 | — | 73.51 |
| Acetic Acid, ppb | 1 | 1 | — | — |
| 25% $CaCl_2$, ppb | 72.66 | 72.66 | 73.51 | — |
| MI-Bar, ppb | 267.35 | 267.35 | 266.19 | 266.19 |

TABLE 8

| | Negative Alkalinity | | With Lime | | | | | |
|---|---|---|---|---|---|---|---|---|
| | Fluid Formulation | | | | | | | |
| | 1 | | 2 | | 3 | | 4 | |
| | Fluid Properties | | | | | | | |
| | Initial | Aged | Initial | Aged | Initial | Aged | Initial | Aged |
| Fluid Weight, ppg | 13.0 | 13.0 | 13.0 | 13.0 | 13.0 | 13.0 | 13.0 | 13.0 |
| Rheol. Temp. ° F. | 150 | 150 | 150 | 150 | 150 | 150 | 150 | 150 |
| 600 rpm | 70 | 46 | 56 | 52 | 56 | 32 | 54 | 42 |
| 300 | 45 | 30 | 32 | 32 | 32 | 16 | 33 | 22 |
| 200 | 30 | 21 | 20 | 25 | 23 | 11 | 25 | 16 |
| 100 | 20 | 15 | 11 | 16 | 15 | 6 | 18 | 10 |
| 6 | 7 | 6 | 4 | 6 | 4 | 1 | 6 | 2 |
| 3 | 6 | 5 | 3 | 5 | 3 | 0 | 5 | 1 |
| PV., cP | 25 | 16 | 24 | 20 | 24 | 16 | 21 | 20 |
| YP, $lb/100\ ft^2$ | 20 | 14 | 8 | 12 | 8 | 0 | 12 | 2 |
| 10 sec. Gel, $lb/100\ ft^2$ | 8 | 6 | 6 | 6 | 5 | 0 | 5 | 2 |
| 10 min, Gel, $lb/100\ t^2$ | 12 | 8 | 8 | 9 | 7 | 1 | 8 | 3 |
| HTHP @ 250° F., cc/30 | — | 0.9 | — | 1.2 | — | 5.2 | — | 4.4 |
| E.S., Vts. | 1223 | 932 | 1279 | 973 | 890 | 237 | 1033 | 254 |
| $CaCl_2$, % | | | | 25 | | | | |
| S/W ratio, % | | | | 80/20 | | | | |

Upon review of the above data one of ordinary skill in the art should appreciate that the negative alkalinity mud (formulations #1; #2) perform better as functional drilling fluids than those drilling fluids formulated with lime (e.g. fluids #3; and #4). A further conclusion can be made that the presence of the lime causes the hydrolysis of the esters present in the mud formulation and thus the loss of properties desirable for drilling fluids. This is in contrast with the fluids of the present invention (fluids #1 and #2) which retain the properties desirable for drilling fluids.

EXAMPLE 4

A blend IO—$C_{16-18}$ mixed with the methyl ester of either rape seed or sunflower seed oils were formulated into muds, the first having negative alkalinty and the second with two pounds per barrel (ppb) of lime. The fluids were prepared to have a mud weight 13.0 ppg, S/W ratio 80/20, in combination with VG-PLUS, Ecogreen P, S, F, and using a 25% calcium chloride brine as the non-oleaginous phase.

The mud was mixed on a Hamilton beach mixer then sheared on a Silverson mixer to 135° F. prior to determining the properties. Properties were checked before and after hot rotating for 16 hours at 250° F. The Theological properties with Fan 35A model, were checked at 40° F. and 150° F. Formulations and properties for those fluids tested are given in the following Tables.

TABLE 9

|  | Negative Alkalinity | | With Lime | |
|---|---|---|---|---|
| Fluid Formulation | 5 | 6 | 7 | 8 |
| Blended 75/25 IO $C_{16-18}$/Methyl Ester Rapeseed Oil, bbl | 0.62 | — | 0.63 | — |
| Blended 75/25 IO $C_{16-18}$/Methyl Ester Sun flower Oil, bbl | — | 0.62 | — | 0.63 |
| VG-PLUS, ppb | 2 | 2 | 4 | 4 |
| Lime, ppb |  |  | 2 | 2 |
| Ecogreen P, ppb | 4 | 4 | 6 | 6 |

TABLE 9-continued

|  | Negative Alkalinity | | With Lime | |
|---|---|---|---|---|
| Fluid Formulation | 5 | 6 | 7 | 8 |
| Ecogreen 5, ppb | 2 | 2 | 2 | 2 |
| EMI-526, ppb | 2 | 2 | 2 | 2 |
| Aramac HT, ppb | 4 | 4 | — | — |
| Acetic Acid, ppb | 1 | 1 | — | — |
| 25% $CaCl_2$, ppb | 72.66 | 72.66 | 73.51 | 73.51 |
| MI-Bar, ppb | 267.35 | 267.35 | 266.19 | 266.19 |

TABLE 10

| | Negative Alkalinity | | | | With Lime | | | |
| --- | --- | --- | --- | --- | --- | --- | --- | --- |
| | Fluid Formulation | | | | | | | |
| | 5 | | 6 | | 7 | | 8 | |
| | Fluid Properties | | | | | | | |
| | Initial | Aged | Initial | Aged | Initial | Aged | Initial | Aged |
| Aged Temp. ° F. | | 250 | | 250 | | 250 | | 250 |
| Aged Time Hrs. | | 16 | | 16 | | 16 | | 16 |
| Static/Rolling | | Rot. | | Rot. | | Rot. | | Rot. |
| Fluid Weight, ppg | 13.0 | 13.0 | 13.0 | 13.0 | 13.0 | 13.0 | 13.0 | 13.0 |
| Rheol. Temp. ° F. | 150 | 150 | 150 | 150 | 150 | 150 | 150 | 150 |
| 600 rpm | 35 | 42 | 40 | 40 | 55 | 39 | 60 | 43 |
| 300 | 22 | 27 | 24 | 24 | 36 | 21 | 40 | 24 |
| 200 | 15 | 18 | 15 | 16 | 25 | 11 | 29 | 16 |
| 100 | 10 | 11 | 10 | 10 | 18 | 6 | 21 | 9 |
| 6 | 3 | 5 | 2 | 2 | 7 | 1 | 9 | 2 |
| 3 | 2 | 4 | 1 | 1 | 5 | 0 | 8 | 1 |
| PV., cP | 13 | 15 | 16 | 16 | 19 | 18 | 20 | 17 |
| YP, lb/100 ft$^2$ | 9 | 12 | 8 | 8 | 17 | 3 | 20 | 7 |
| 10 sec. Gel, lb/100 ft$^2$ | 2 | 4 | 2 | 2 | 8 | 0 | 8 | 1 |
| 10 min, Gel, lb/100 t$^2$ | 5 | 7 | 5 | 6 | 10 | 1 | 12 | 3 |
| HTHP @ 250° F., cc/30 | — | 3.0 | — | 4.2 | — | 6.4 | — | 5.0 |
| E.S., Vts. | 1293 | 1003 | 1195 | 982 | 1044 | 271 | 1021 | 250 |
| CaCl$_2$,% | | | | 25 | | | | |
| S/W ratio, % | | | | 80/20 | | | | |

Upon review of the above, one of skill in the art should appreciate that both ester products were performed better under conditions of negative alkalinity mud before and after aging. It should also be appreciated that the rapeseed oil methyl ester performed better than sun flower oil methyl ester, based on rheological properties and stability.

A contamination study was conducted with 30 ppb of Rev Dust, 5% of class G cement and 10% of zechstine. The results of this study showed that this system is stable @250° F., as indicated by the rheology, electrical stability, and HTHP fluid loss in the presence of such contaminates.

In view of the proceeding, one of ordinary skill in the art should understand and appreciate that in one illustrative embodiment of the present invention an invert emulsion drilling fluid includes: an invert emulsion drilling fluid having negative alkalinity that includes an oleaginous phase; a non-oleaginous phase and an emulsifying agent capable of stabilizing an invert emulsion drilling fluid under conditions of negative alkalinity. The oleaginous phase should be formulated such that it includes a hydrocarbon fluid and an ester of a $C_1$ to $C_{12}$ alcohol and a $C_8$ to $C_{24}$ monocarboxylic acid. This mixture of fluids should formulated such that the invert emulsion drilling fluid is compatible with elastomeric materials. In one illustrative embodiment the hydrocarbon fluid is selected from diesel oil, mineral oil, synthetic oil, linear alpha olefins and internal olefins, and combinations thereof. The oleaginous phase is preferably formulated such that a minority of the oleaginous fluid comprises of esters of $C_1$–$C_{12}$ alcohols and $C_8$–$C_{24}$ monocarboxylic acids. The emulsifying agent should be capable of stabilizing the invert emulsion when the non-oleaginous phase is an aqueous acidic solution, thus the addition of an aqueous acidic solution to the invert emulsion does not cause the invert emulsion to break. In one illustrative embodiment, the non-oleaginous phase has a hydroxide ion concentration of less than $1\times10^{-7}$ moles per liter. It is preferred that in one illustrative embodiment the emulsifying agent is selected from the group consisting of: imidazoline, amidoamines of fatty acids, tall oil fatty acids, and protonated amines having the structure

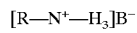

wherein R is a $C_{12}$–$C_{22}$ alkyl group or a $C_{12}$–$C_{22}$ alkenyl group and B- is a conjugate base of an acid. In one further preferred illustrative embodiment, the R group on the protonated amine emulsifier is selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof. The counter ion (B⁻) of the protonated amine may be the conjugate base of an aqueous acid, preferably and acid is selected from sulfuric acid, nitric acid, hydrofluoric acid, hydrochloric acid, phosphoric acid, boric acid, citric acid, acetic acid, formic acid, benzoic acid, salicyclic acid, oxalic acid, glycolic acid, lactic acid, glutaric acid, halogenated acetic acids, organosulfonic acids, organophosphoric acids and compounds that generate acidic solutions upon dissolution in water selected from acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and combinations of these. It is preferred that in one illustrative embodiment, that the emulsifying agent have a concentration from about 0.1 to about 10.0 percent by weight to volume of said drilling fluid. The non-oleaginous phase can be selected from fresh water, sea water, brine, aqueous solutions containing water soluble organic salts, water soluble alcohols or water soluble glycols or combinations thereof. The drilling fluid of the present illustrative embodiment may further include a weighting agent, such as barite, calcite, mullite, gallena, manganese oxides, iron oxides, or combinations thereof.

The present invention also includes a method of drilling a subterranean well with an invert emulsion drilling fluid as described in preceding illustrative embodiment. Such a method includes formulating the invert emulsion drilling fluid as described above and drilling said well with said invert emulsion drilling fluid.

Another illustrative embodiment of the present invention includes an invert emulsion drilling fluid having negative alkalinity. The illustrative emulsion drilling fluid includes: an oleaginous phase; a non-oleaginous phase and an emulsifying agent capable of stabilizing an invert emulsion drilling fluid under conditions of negative alkalinity. The illustrative drilling fluid should be formulated to form an invert emulsion drilling fluid that is compatible with elastomeric materials. The oleaginous phase preferably includes a hydrocarbon fluid and an ester of a $C_1$ to $C_{12}$ alcohol and a $C_8$ to $C_{24}$ monocarboxylic acid. Preferably the hydrocarbon fluid is selected from diesel oil, mineral oil, synthetic oil linear alpha olefins internal olefins and combinations thereof. Further the illustrative fluids should be formulated such that a minority of the oleaginous fluid comprises of esters of $C_1$–$C_{12}$ alcohols and $C_8$–$C_{24}$ monocarboxylic acids. The non-oleaginous phase of the illustrative embodiment preferably has a hydroxide ion concentration less than $1\times10^{-7}$ moles per liter. In one illustrative embodiment the non-oleaginous phase is selected from fresh water, sea water, brine, aqueous solutions containing water soluble organic salts, water soluble alcohols or water soluble glycols or combinations thereof. The drilling fluid of the present illustrative embodiment may further include a weighting agent, such as barite, calcite, mullite, gallena, manganese oxides, iron oxides, or combinations thereof.

The present invention also includes a method of drilling a subterranean well with an invert emulsion drilling fluid as described in the preceding illustrative embodiment. Such a method includes: formulating the invert emulsion drilling fluid as described above and drilling said well with said invert emulsion drilling fluid.

While the compositions and methods of this invention have been described in terms of preferred and illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An invert emulsion drilling fluid having negative alkalinity, said invert emulsion drilling fluid comprising:
    an oleaginous phase including
        a hydrocarbon fluid and
        an ester of a $C_1$ to $C_{12}$ alcohol and a $C_8$ to $C_{24}$ monocarboxylic acid
    a non-oleaginous phase
    an emulsifying agent capable of stabilizing an invert emulsion drilling fluid under conditions of negative alkalinity,
wherein said invert emulsion drilling fluid is compatible with elastomeric materials, and wherein said emulsifying agent is selected from the group consisting of: imidazoline, amidoamines of fatty acids, tall oil fatty acids, and protonated amines having the structure

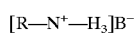
[R—N$^+$—H$_3$]B$^-$ wherein R is a $C_{12}$–$C_{22}$ alkyl group or a $C_{12}$–$C_{22}$ alkenyl group and B- is a conjugate base of an acid.

2. The drilling fluid of claim 1 wherein said emulsifying agent is capable of stabilizing the invert emulsion when the non-oleaginous phase is an aqueous acidic solution.

3. The drilling fluid of claim 1 wherein the addition of an aqueous acidic solution to the invert emulsion does not cause the invert emulsion to break.

4. The drilling fluid of claim 1 wherein the non-oleaginous phase has a hydroxide ion concentration of less than $1\times10^{-7}$ moles per liter.

5. The drilling fluid of claim 1 wherein the R group on the protonated amine emulsifier is selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof.

6. The drilling fluid of claim 1 wherein the counter ion (B$^-$) of the protonated amine is conjugate base of an aqueous acid is selected from sulfuric acid, nitric acid, hydrofluoric acid, hydrochloric acid, phosphoric acid, boric acid, citric acid, acetic acid, formic acid, benzoic acid, salicyclic acid, oxalic acid, glycolic acid, lactic acid, glutaric acid, halogenated acetic acids, organosulfonic acids, organophosphoric acids and compounds that generate acidic solutions upon dissolution in water selected from acetic anhydride, hydrolyzable esters, hydrolyzable organosulfonic acids, hydrolyzable organophosphoric acids, phosphorus trihalide, phosphorous oxyhalide, acidic metal salts, sulfur dioxide, nitrogen oxides, carbon dioxide, and combinations of these.

7. The drilling fluid of claim 1, wherein the emulsifying agent comprises from about 0.1 to about 10.0 percent by weight to volume of said drilling fluid.

8. An invert emulsion drilling fluid having negative alkalinity, said invert emulsion drilling fluid comprising:
    an oleaginous phase including
        a hydrocarbon fluid and
        an ester of a $C_1$ to $C_{12}$ alcohol and a $C_8$ to $C_{24}$ monocarboxylic acid
    a non-oleaginous phase
    an emulsifying agent capable of stabilizing an invert emulsion drilling fluid under conditions of negative alkalinity,
wherein said invert emulsion drilling fluid is compatible with elastomeric materials, and wherein the hydrocarbon fluid is selected from diesel oil, mineral oil, synthetic oil and combinations thereof.

9. The drilling fluid of claim 8 wherein a minority of the oleaginous fluid comprises of esters of $C_1$–$C_{12}$ alcohols and $C_8$–$C_{24}$ monocarboxylic acids.

10. The drilling fluid of claim 8 wherein the ester is selected from the methyl ester of sunflower oil and the methyl ester of rapeseed oil.

11. The drilling fluid of claim 8, further comprising a weighting agent, said weighting agent being selected from barite, calcite, mullite, gallena, manganese oxides, iron oxides, or combinations thereof.

12. The drilling fluid of claim 8 wherein the non-oleaginous phase is selected from fresh water, sea water, brine, aqueous solutions containing water soluble organic salts, water soluble alcohols or water soluble glycols or combinations thereof.

13. A method of drilling a subterranean well with an invert emulsion drilling fluid comprising:
    formulating the invert emulsion drilling fluid of claim 8 and
    drilling said well with said invert emulsion drilling fluid.

14. An invert emulsion drilling fluid having negative alkalinity, said invert emulsion drilling fluid comprising:
    an oleaginous phase including
        a hydrocarbon fluid and
        an ester of a $C_1$ to $C_{12}$ alcohol and a $C_8$ to $C_{24}$ monocarboxylic acid
    a non-oleaginous phase, wherein said non-oleaginous phase has a hydroxide ion concentration less than $1\times10^{-7}$ moles per liter;
    an emulsifying agent capable of stabilizing an invert emulsion drilling fluid under conditions of negative alkalinity, wherein said invert emulsion drilling fluid is compatible with elastomeric materials, and wherein the hydrocarbon fluid is selected from diesel oil, mineral oil, synthetic oil and combinations thereof.

15. The drilling fluid of claim 14 wherein a minority of the oleaginous fluid comprises of esters of $C_1$–$C_{12}$ alcohols and $C_8$–$C_{24}$ monocarboxylic acids.

16. An invert emulsion drilling fluid having negative alkalinity, said invert emulsion drilling fluid comprising:

an oleaginous phase including
 a hydrocarbon fluid and
 an ester of a $C_1$ to $C_{12}$ alcohol and a $C_8$ to $C_{24}$ monocarboxylic acid a non-oleaginous phase, wherein said non-oleaginous phase has a hydroxide ion concentration less than $1 \times 10^{-7}$ moles per liter;

an emulsifying agent capable of stabilizing an invert emulsion drilling fluid under conditions of negative alkalinity, wherein said invert emulsion drilling fluid is compatible with elastomeric materials, and wherein the ester is selected from the methyl ester of sunflower oil and the methyl ester of rapeseed oil.

17. A method of drilling a subterranean well with an invert emulsion drilling fluid comprising:

formulating the invert emulsion drilling fluid of claim 14 and drilling said well with said invert emulsion drilling fluid.

* * * * *